H. K. & G. E. ROBERTS.
Corn Planter.
No. 98,886. Patented Jan. 18, 1870.
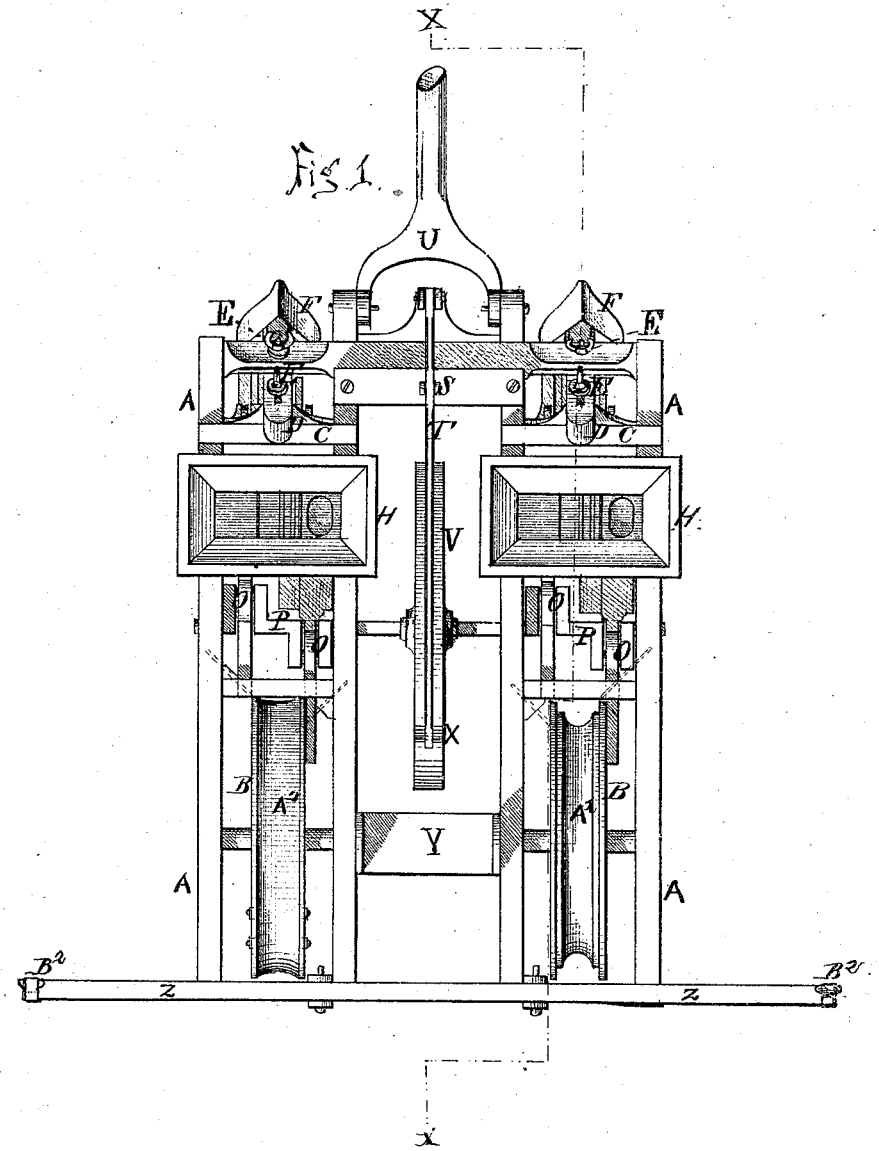
Witnesses
E. F. Huyck
George Kerr, Jr
Henry K. & George E. Roberts
by John O. Hewitt
his attorney in fact

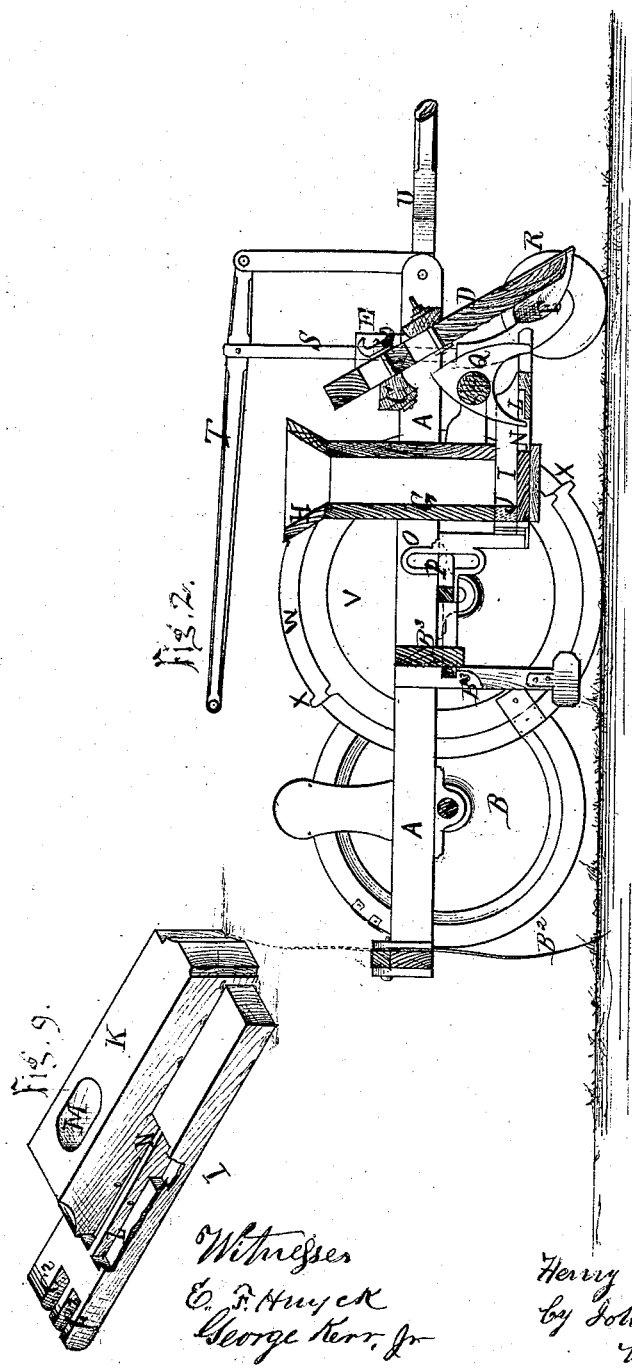

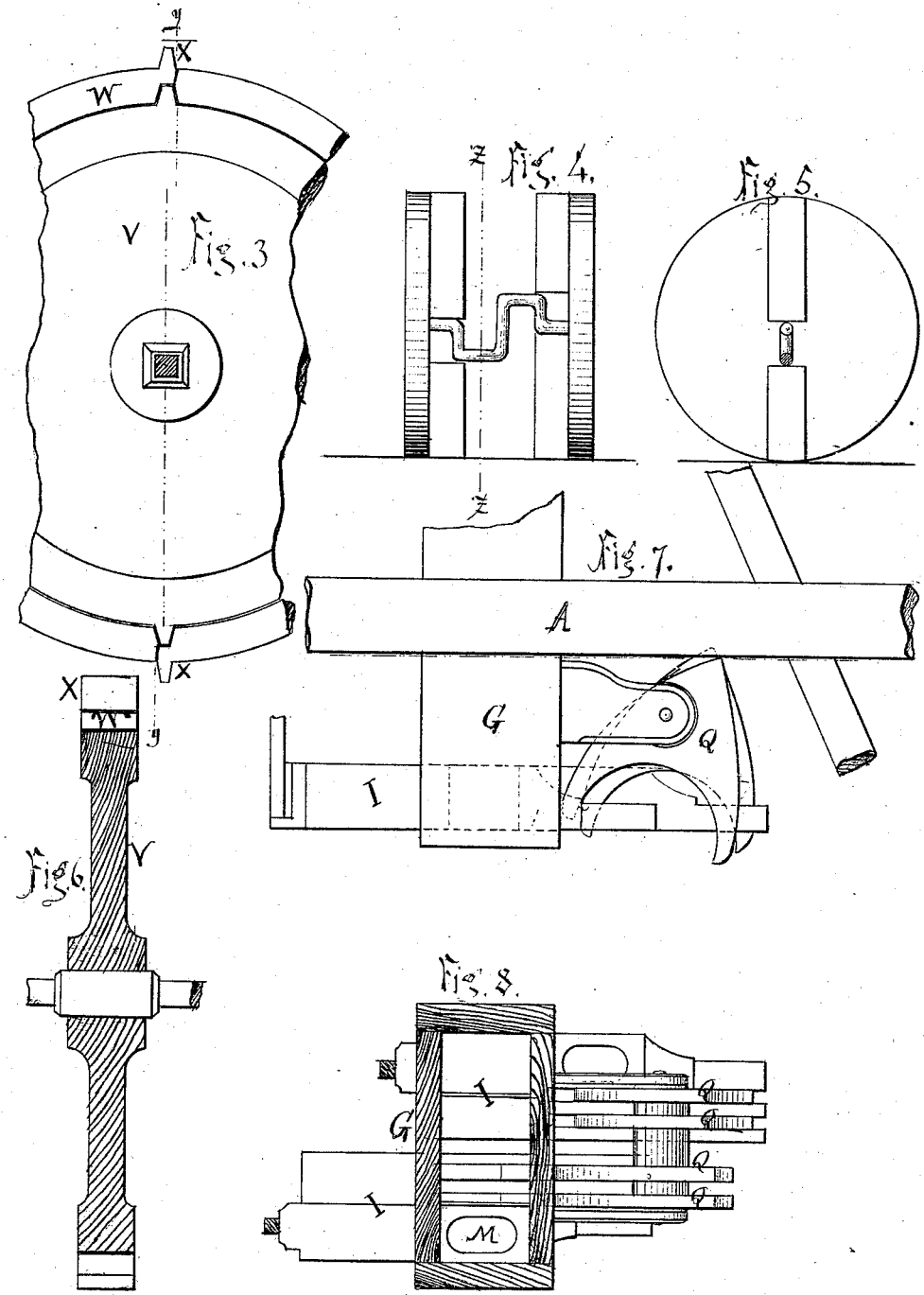

United States Patent Office.

HENRY K. ROBERTS AND GEORGE E. ROBERTS, OF JEFFERSON COUNTY, KENTUCKY.

Letters Patent No. 98,886, dated January 18, 1870.

IMPROVEMENT IN CORN-PLANTER AND FERTILIZER.

The Schedule referred to in these Letters Patent and making part of the same.

*To all whom it may concern:*

Be it known that we, HENRY K. ROBERTS and GEORGE E. ROBERTS, of Jefferson county, and State of Kentucky, have invented a new and useful Improvement in Machines for Planting Corn, and Fertilizing the same; and we do hereby declare that the following is a full, clear, and exact description thereof, reference being had to the annexed drawings, and to the letters of reference marked thereon.

To enable others skilled in the art to make and use our invention or improvement, we will proceed to describe its construction and operation, by reference to the drawings, and the letters of reference marked thereon.

Figure 1, sheet 1, is a top view of our planter complete.

Figure 2, sheet 2, is a longitudinal section, taken in the line $x\ x$, fig. 1.

Figure 3, sheet 3, is a partial side view of the dropping-wheel.

Figure 4, sheet 3, is a front view of a double wheel with compound cranks, to be used as a substitute for the dropping-wheel, in the construction of a single machine.

Figure 5, sheet 3, is a section through the line $z\ z$, fig. 4.

Figure 6, sheet 3, is a section through the line $y\ y$, fig. 3.

Figures 7 and 8, sheet 3, are respectively side and top views of the corn dropping mechanism.

Figure 9, sheet 2, is a perspective view of one of the corn-slides.

A is the frame, which is made of wood, of about two by three-inch oak, and six feet long, by four feet ten inches wide, properly framed together, as shown in the drawings.

C C are cross-pieces, of about two by three-inch oak, let in about ten inches from the front, and to which the plow-standards D D are attached, which standards are made of oak, about two by three inches, having a long half-inch slot, for the purpose of adjusting the depth of the plows when in use, and to raise them when leaving the field.

E E E are the thumb-screws, for adjusting the plows.

F is the plow, which is made of iron or steel, in the form of a double-wing mould-board, and secured to the standards D by means of bolts; and where it is intended to use the fertilizer, the wings must be seven inches apart at their extremities. When no fertilizer is used, four inches will be sufficient.

G G are the boxes in which the corn and fertilizer are deposited, and which are made of wood, about eighteen inches long, and five by six inches square in the inside. The front and rear are made of three-quarter-inch pine lumber. The sides are made of three-quarter-inch hard lumber.

The above boxes are divided into three compartments each, by tin or sheet-iron partitions, the middle pipes of which are three by five inches, and the outside ones, one and one-half by five inches square. The middle ones are for the corn, and the outside ones for the fertilizer.

H H are the hoppers, which contain the corn and fertilizing-material, and should, when in use, be divided into three compartments similar to the boxes G G, the lower ends of which are cut out in front and rear, one and one-half inch deep, permitting the dropping-slide I to pass through and fit the sides of the box neatly, and are held up by the bottom of the box, which is about half an inch thick, and on which they slide.

J is a piece of stiff gum, or rubber, attached to the front and rear, in the centre of the lower end of the boxes G G, for the purpose of striking off all but the proper number of grains, and forcing one along each groove into its proper cups in the dropping-slide I, said dropping-slide I being made of hard wood, or other material, about thirteen inches long, by two and five-sixteenths inches wide, and three-eighths of an inch thick.

N N are two little mortises, five-eighths of an inch long and one-fourth of an inch wide, cut through the slide I, leaving one-sixteenth of an inch of wood between them, and one-eighth of an inch on each, outside.

L L are two grooves, one fourth of an inch wide, three-sixteenths of an inch deep, and five inches long, cut on a line with the mortises N N, and acts as a receptacle for the corn until forced into the drop-holes N N by the gum J, out of which they are driven by the punches Q Q at every half revolution of the wheels.

K is a piece of hard wood, one and one-half inch wide, one and one-sixteenth inch thick, and thirteen inches long, placed on the top of the corn-dropping slide I, with a mortise through it of any size sufficient to deliver the required amount of fertilizing-material.

O O are the slot-shaped yokes, to which the slides I and K are attached.

P P are the cranks by which they are operated, and all of which are made of three-quarter-inch round iron, these cranks acting as the axle for the wheel V. The part that passes through it, is about one and one-fourth inch diameter.

Q Q are the punches, made of iron, one-eighth of an inch thick, for the purpose of forcing the grains of corn through the holes N N. In the dropping-slide I, they are operated by the slotted ends of the dropping-slide I I striking the lower arm of the punches Q Q, they being made somewhat in the form of a triangle, the lower points being used as the arm by which they are operated, while the other point is slightly curved at the end, and acts as a punch to the holes N N, forcing out the grains of corn, or anything that may be therein.

R is a small wheel, about a foot in diameter, under the front of the machine, for the purpose of raising the dropping-wheel V clear of the ground, to stop the dropping, to regulate the depth of the plows, and to aid in turning. This wheel is made of iron, similar in form to the casters of furniture, with the spindle S extending up through the frame, and connecting with the lever T, by which it is operated.

U is the tongue by which the machine is drawn.

V is the centre, or dropping-wheel, which is made of iron, and by the revolutions of which the distance between the hills of corn is regulated, and, when it is desirable to increase the distance between them, the false or temporary rim W is put on, which increases the diameter of the wheel, and hence increases the distance between the hills.

X X are projections on the face of the wheel V and rim W, in order to mark the line of cross-rows.

Y is the seat for the driver.

B B are the two hind wheels of the machine, which are made of iron, with the faces grooved out deep, similar to a sheave.

A' A' are temporary sheet-iron coverings for the face of the wheels B B, which are put on when it is necessary to press the hills of corn, and can be removed when not necessary to press them.

B² B² are the markers, for marking the next rows. They are made of thin iron, so as to be elastic, and are reversed when the machine is turned.

B³ B³ are the coverers, and are made of wrought or cast-iron, about four inches wide and six inches long. Said coverers are placed, one on each side of the row, and set at an angle to each other, so as to drag the earth toward each other, when in use.

The above is a description of the construction of the improvement.

Its operation consists in filling the corn-boxes G G with corn and fertilizing-material; after which put the machine in motion, and, by means of the dropping-wheel V, motion is transmitted to the dropping-slides I I and K, by which the dropping-process is accomplished; after which each hill is covered by the coverers B³ B³, on the under side of the frame A, and slightly pressed down by the wheels B B, when required. Therefore,

What we claim as our invention or improvement, and desire to secure by Letters Patent, is—

1. The parallel bars or slotted cam-yokes O O, in combination with the compound cranks P P and corn-slides I I.

2. The corn-slides I I, with the single-grain cups N N, and fertilizer-cups M, and gum-scrapers J J.

3. The wheels B B, constructed, as described, with deep grooves, and provided with the removable coverings A A, as and for the purpose set forth.

4. The corn-punchers Q Q, constructed and arranged as shown in the drawings.

5. The combination of the frame A A, the marking-lever Z, with its marker B² B², and the plows and standards F and D, with their thumb-screws E E; also the lever T, and wheel R, and spindle S, when arranged, constructed, and operating in the manner set forth.

HENRY K. ROBERTS.
GEO. E. ROBERTS.

Witnesses:
B. F. ROBERTS,
BENJN. GROVE.